Patented Nov. 10, 1953

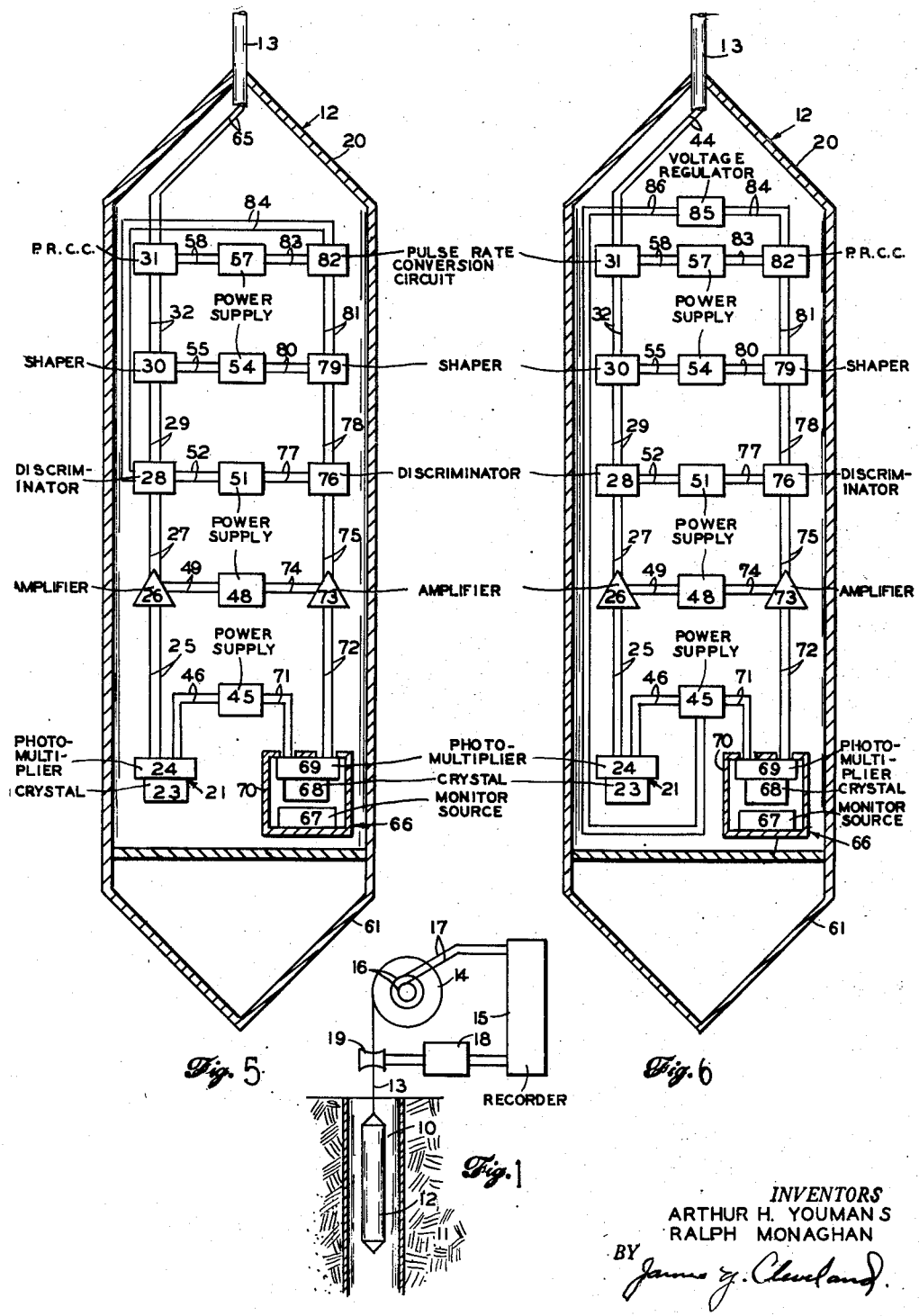

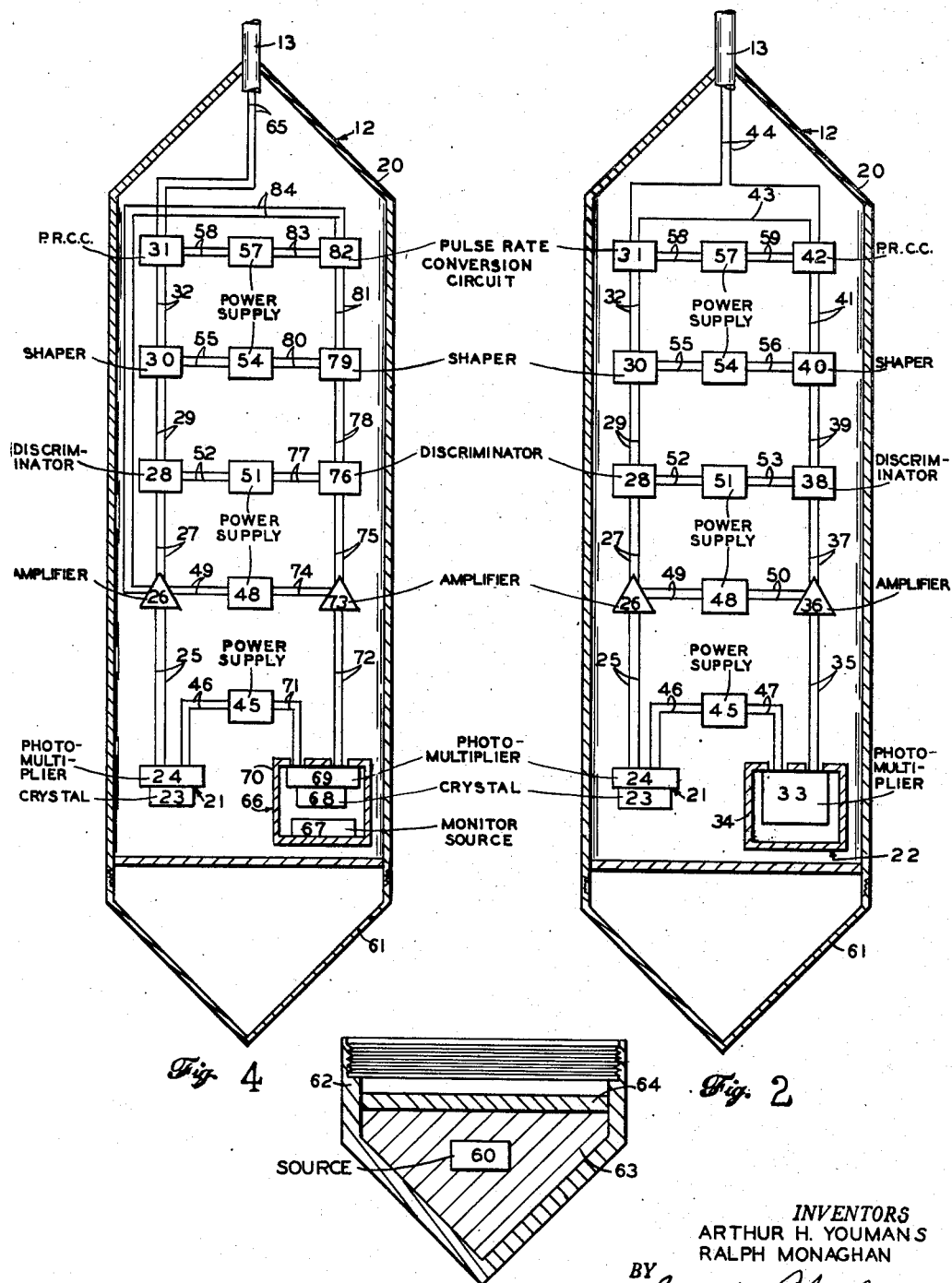

2,659,011

UNITED STATES PATENT OFFICE 2,659,011

METHOD AND APPARATUS FOR COMPENSATION FOR THE EFFECTS OF TEMPERATURE AND VOLTAGE FLUCTUATIONS ON SCINTILLATION COUNTERS

Arthur H. Youmans and Ralph Monaghan, Tulsa, Okla., assignors to Well Surveys, Incorporated, Tulsa, Okla., a corporation of Delaware Application May 23, 1951, Serial No. 227,854

23 Claims. (Cl. 250—71)

This invention relates to the art of geophysical prospecting and more particularly to the art of radioactivity well-logging wherein scintillation counters comprising fluorescent media in conjunction with photomultipliers are used to detect radiation.

It is old in the art to log oil wells by measuring the natural radioactivity of the strata or by irradiating the strata adjacent the drill hole with fast neutrons or penetrating gamma radiation and simultaneously traversing the well with a gamma ray or neutron detector or both. Such detectors have been of the type which employs a gaseous ionizable medium and produces electrical pulses or continuous current. More recently a detector of relatively high efficiency has been found, the scintillation counter. Scintillation counters may have solid or liquid fluorescent media. Such counters have certain advantages over a gaseous detector—their greater density permits a smaller size detector which is desirable in the small space available in a well-logging instrument; their low resolving time permits high speed counting; their high efficiency provides a good signal-to-noise ratio; and their high stopping power is useful in gamma ray and high-energy particle detection.

The scintillation counter has been well developed for laboratory use, but it cannot readily be used with accuracy to detect radiation in a deep, narrow well because of the high ambient temperatures often encountered in deep bore holes. Temperatures as high as 400° F. are sometimes encountered. Even when such extreme conditions are not present, there is nevertheless a variation of temperature with depth which produces a change in several of the critical parameters of the scintillation counter. The efficiency of the fluorescent medium changes with temperature, that is, at one temperature the medium radiates a different number of photons of light for a given incident radiation than at another temperature. Not only are a different number of photons of light produced in the medium, but the fraction of those produced that get out of the medium to the photosurface is affected by the absorbency of the medium of its own radiations and its index of refraction which also depend upon temperature. In addition, amplification of pulses in the photomultiplier may vary. Amplifiers and other electronic equipment used in conjunction with the scintillation counter may also be temperature dependent. In addition to the variation of the above factors with temperature, amplification by the photomultiplier depends upon applied voltage; in fact, the multiplication in each stage of the electronmultipler varies with voltage so that overall gain will vary with a power of the voltage corresponding to the number of stages of amplification in the photomultiplier. For example, the amplification by an RCA photomultiplier tube type 5819 operating at 900 volts will change about 10% when the applied voltage changes 1%.

These factors change pulse height; they do not change the number of pulses arising from scintillations except for the smallest pulses. The smallest pulses are produced by the weakest incident gamma radiation or neutron energy which produce so few photons of light in the scintillation medium that there is only reasonable certainty that a photon will reach the photosurface to knock off an electron and little chance that several photons will reach it. If the efficiency of the scintillation medium decreases, there is less likelihood of a photon's reaching the photosurface and there is less likelihood that the scintillation will produce a pulse, and pulses are random for very low incident gamma radiation or neutron energy. This random effect is conventionally eliminated by discriminating against pulses having less than a certain height, but changes in pulse height then change the number of pulses passed by the discriminator. Since the output of the detector depends upon the number of pulses passed by the discriminator, output varies when temperature and voltage changes produce variation in pulse height.

This invention comprises a scintillation counter adapted for use in radioactivity well-logging. A monitor unit is used in the subsurface instrument to provide compensation for changes in temperature and/or voltage. To this end, the monitor unit comprises a photomultiplier tube which may be identical with the tube or tubes used in the detectors of radiation from the strata. The unit also comprises a scintillation medium preferably similar to the material used as the medium or media of the detectors. The unit is irradiated from a radioactive source which may be shielded if necessary but which emits radiation preferably similar to that being detected by the other counters in the instrument. Since the radiation from this source will be independent of temperature and voltage, any variation in the output of the monitor unit will be the result of temperature variations or lack of regulation in the voltage supply. The output of the monitor unit may be used to control the voltage regulator or the amplifiers used in amplifying the signal from the detectors. Alternatively, it may be used to correct counting rates or pulse height measurements.

In addition to the temperature effect on pulse height, there is a variation in number of pulses due to a change in dark current pulses. Dark current pulses are random pulses arising spontaneously in the photomultiplier without light striking the photosurface. These pulses always interfere with detection, for they introduce a spurious component into the output signal. However, at high temperatures these pulses are especially troublesome since they have been found in some cases to be approximately doubled in number with each 20° C. increase in temperature. In eliminating the dark current component and the effect of temperature or voltage changes thereupon, this invention utilizes a monitor unit comprising a photomultiplier but no scintillation medium. The output of the monitor unit is subtracted from the detector output to eliminate the dark current component.

Therefore, he primary object of this invention is to provide a method and apparatus for making a radioactivity well-log with a scintillation counter which is compensated for temperature and voltage fluctuations. Another object is to eliminate dark current pulses from the output of a scintillation counter system used in making a radioactivity well-log. This invention also contemplates the use of a monitor unit to make the output of a scintillation counter always the same for a given incident radiation when the counter is used in radioactivity well-logging. Other objects and advantages of the present invention will become apparent from the following detailed description when considered with the accompanying drawings, in which:

Figure 1 is a diagrammatic illustration of a geophysical well-logging operation;

Figure 2 is an enlarged vertical sectional view of one form of the subsurface instrument adapted to eliminate dark currents and the effect of temperature and voltage changes thereupon;

Figure 3 is an enlarged vertical sectional view of a radiation source sub adapted to be attached to the bottom of the instrument shown in Figure 2;

Figure 4 is an enlarged vertical sectional view of a form of the subsurface instrument adapted to eliminate the effect of temperature and voltage variation by varying the gain of the amplifier in the radiation detecting system;

Figure 5 shows a modified form of the subsurface instrument also adapted to eliminate the effect of temperature and voltage variation by varying the operating characteristics of the discriminator in the radiation detecting system; and Figure 6 shows a further modification of the subsurface instrument adapted to eliminate the effect of temperature and voltage variation by regulating the voltage from a power supply in the radiation detecting system.

In the art of radioactivity well-logging, certain logs are made by measuring the gamma radiation naturally emitted by the formations surrounding a drill hole. Other radioactivity logs are made by irradiating the formations adjacent the drill hole with penetrating radiations and detecting gamma radiation or neutrons influenced thereby. In Figure 1 of the drawings there is illustrated a well surveying operation by which any of these logs may be made. A well 10 penetrates the earth's surface 11 and may or may not be cased. Disposed within the well is subsurface instrument 12 of the well-logging system. Instrument 12 houses the scintillation counter and the monitor unit. Cable 13 suspends the instrument in the well and electrically connects the instrument with the surface apparatus. The cable is wound on or unwound from drum 14 in raising and lowering instrument 12 to traverse the well. Cable 13 is electrically connected to recorder 15 through sliprings 16 and brushes 17. Recorder 15 is driven through a transmission 18 by measuring reel 19 over which cable 13 is drawn so that recorder 15 moves in correlation with depth as instrument 12 traverses the well.

Subsurface instrument 12 shown in Figure 1 may take the form illustrated diagrammatically in vertical section in Figure 2. The instrument as shown in Figure 2 is adapted for use in making a log of a drill hole by measuring the natural radioactivity emitted by the formations. The form of the invention as shown in Figure 2 comprises a monitor unit adapted to eliminate dark current pulses and the effect of temperature or voltage changes thereon.

Subsurface instrument 12 comprises a housing 20 which encloses a scintillation counter 21 and monitor unit 22 and associated circuits. Scintillation counter 21 comprises scintillation medium 23 and photomultiplier 24. In making a radioactivity well-log with this apparatus, instrument 12 is caused to traverse the formations penetrated by the well, whereby natural gamma radiation emitted by the formations impinges upon scintillation medium 23. The scintillation medium responds to the radiation by producing photons of light which are transmitted through the medium to the photomultiplier 24. These photons of light strike the photosurface of photomultiplier 24 thereby producing electrons which are multiplied in the multiplier section of the photomultiplier, producing current pulses which are transmitted through conductors 25 to amplifier 26. The amplified pulses are conducted via conductors 27 to pulse height discriminator 28 which may be regulated, in a manner well-known in the art, to pass only pulses above a selected magnitude. Discriminator 28 will eliminate many dark current pulses, for dark pulses are mostly of small magnitude relative to the pulses resulting from scintillation; however, some dark current pulses will be of comparable magnitude, and these will be of increased significance at higher temperatures. The pulses passed by discriminator 28 are conducted through conductors 29 to shaper 30 which shapes the pulses so that each pulse has the same effect as any other upon pulse rate conversion circuit 31 to which the shaped pulses are conducted through conductors 32. Pulse rate conversion circuit 31 functions in a conventional manner to produce a direct current voltage that varies in magnitude in accordance with the rate of occurrence of the pulses fed to it. This direct current voltage is a measure of the gamma radiation from the formations impinging upon the scintillation medium, but it contains a component due to dark current pulses, especially at high temperatures.

To eliminate the dark current component, there is provided a monitor unit 22 comprising monitor photomultiplier 33 surrounded by a shield 34 which excludes light from the photosurface of the photomultiplier. Photomultiplier 33, not having incident light, will produce output pulses which are solely dark current pulses. Photomultiplier 33 is as near identical with photomultiplier 24 as possible so that the output of photomultiplier 33 will be the same as the dark current component of the output of photomultiplier 24. The output of photomultiplier 33 is conducted by conductors 35 to amplifier 36. The amplified signal is conducted by conductors 37 to pulse height discriminator 38 which eliminates substantially the same range of pulses as discriminator 28 and passes only the larger dark current pulses. The pulses passed are conducted by conductors 39 to shaper 40 which is connected by conductors 41 to pulse rate conversion circuit 42. Pulse rate conversion circuit 42 functions like pulse rate conversion circuit 31 to produce a direct current voltage that varies in magnitude in accordance with the rate of occurrence of the pulses fed to it. This direct current voltage is equal to the dark current component in the output of pulse rate conversion circuit 31; when change in temperature or voltage changes the dark current component in the counter circuit, the dark current of the monitor changes equally. Conductor 43 joins the outputs of pulse rate conversion circuits 31 and 42 in polarity opposition so that the net voltage is the difference in the two signals. This is, in effect, the subtraction of the dark current component from the output of pulse rate conversion circuit 31. The net voltage is then a measure of the gamma radiations of the formations with the dark current component eliminated. This necessarily eliminates the variation of the dark current component with temperature. The net signal is transmitted by conductors 44 and cable 13 to the surface where it is recorded by recorder 15 in correlation with the depth at which the signal is produced. Under some conditions it may be desirable to use an amplifier at the surface to offset losses incurred in transmission.

Power supply 45 supplies power through conductors 46 and 47 to photomultipliers 24 and 33, respectively. Power supply 48 supplies power through conductors 49 and 50 to amplifiers 26 and 36, respectively. Power supply 51 supplies power through conductors 52 and 53 to discriminators 28 and 38, respectively. Power supply 54 supplies power through conductors 55 and 56 to shapers 30 and 40, respectively. Power supply 57 supplies power through conductors 58 and 59 to pulse rate conversion circuits 31 and 42, respectively. It is to be understood that the power supplies 45, 48, 51, 54, and 57 may be replaced by suitable transformers and rectifiers which are supplied with power through cable 13 from the surface of the earth, or the power may be supplied from a single subsurface power supply suitably isolating each circuit component in a manner well-known in the art.

The instant invention as described thus far finds equal application in making well logs when using a source of radiation. In operation the subsurface device illustrated in Figure 2 may be modified to include a radiation source 60 by removing the bottom portion 61 of the housing thereof and replacing it with the sub shown in Figure 3 which carries the radiation source 60. If source 60 emits both neutrons and gamma rays and only neutrons are desired, then the sub shown in Figure 3 comprises the housing 62 which encloses a high density gamma ray absorber 63 in which is embedded a radiation source 60. It will be desirable to interpose between the radiation source and the detector a neutron absorbing shield. This may be located in the sub as indicated at 64 in Figure 3. If source 60 is a gamma ray source, absorber 63 is omitted and absorber shield 64 may be made of a high density material to stop direct passage of gamma rays from source to detector.

The apparatus resulting from the combination of the devices illustrated in Figures 2 and 3 is adapted for use in making a neutron-gamma ray log, that is, a log which represents gamma radiation produced by neutron interactions in the formations. In this instance the source of radiation 60 would be one which emits neutrons. A gamma-gamma log, that is, one made by irradiating the formations with penetrating gamma radiations and detecting gamma radiations influenced by the formations, can also be made without modifying the detecting or recording system of the device. In this instance the radiation source 60 would be one which emits penetrating gamma radiations.

The scintillation counter is readily adapted to detect neutrons by replacing the scintillation medium used for the detection of gamma radiation by one which will respond to neutrons. Such a detector is adapted for use in making a neutron-neutron log, that is, one made by irradiating the formations with fast neutrons and detecting neutrons influenced by the formations. In this instance the source of radiation 60 would be one which emits neutrons.

In all the above logs the effect of dark current is eliminated by the monitor circuit of Figure 2. In Figure 4 there is illustrated a form of the invention comprising a monitor unit adapted to eliminate the effect of temperature and voltage changes upon amplification and hence pulse height, which effect changes the number of pulses passed by the discriminator of the detector circuit and hence changes the output signal to be recorded. The detector circuit is as in Figure 2 with the output of pulse rate conversion circuit 31 conducted by conductors 65 to the surface for recording. The monitor circuit is made analogous to the detector circuit so that any temperature or voltage variations affecting the detector output affect the monitor output similarly.

Monitor unit 66 comprises a source of radiation 67, a scintillation medium 68, and a photomultiplier 69 all housed inside shield 70 which keeps out light and radiation which would cause scintillation medium 68 to scintillate. The shield also keeps monitor unit 66 and scintillation counter 21 from affecting each other. Scintillation medium 68 is preferably made of the same material as scintillation medium 23, and photomultiplier 69 is substantially identical with photomultiplier 24. Source 67 should be of material which will emit radiations similar to those producing scintillations in crystal 23; polonium, cobalt 60, sodium 22, or radium are suitable. Power is supplied to photomultiplier 69 from power supply 45 through conductors 71. The output pulses from monitor unit 66 are conducted by conductors 72 to amplifier 73, supplied with power from power supply 48 through conductors 74. The amplified pulses are conducted by conductors 75 to discriminator 76, supplied with power from power supply 51 through conductors 77. The pulses passed by discriminator 76 are conducted by conductors 78 to shaper 79, supplied with power from power supply 54, through conductors 80. The shaped pulses are conducted by conductors 81 to pulse rate conversion circuit 82, supplied with power from power supply 57 through conductors 83. The output of pulse rate conversion circuit 82 is a direct current voltage the magnitude of which is proportional to the number of scintillations producing pulses of a height passed by discriminator 76.

Except for slow aging of circuit components and decay of source 67, the output of pulse rate conversion circuit 82 is constant for given operating conditions. Any change in pulse height will be due to a change in voltage or temperature and will be indicated by a change in output of pulse rate conversion circuit 82. This output may therefore be used to compensate for any change in pulse height and thus eliminate all effects of temperature and voltage on the output of pulse rate conversion circuit 31. As shown in Figure 4, the output of pulse rate conversion circuit 82 is applied through conductors 84 to amplifier 26 to change the gain of amplifier 26 in a conventional manner such as to make the overall amplification of the detector circuit a constant.

As shown in Figure 5, temperature and voltage variations may alternatively be compensated by applying the output of pulse rate conversion circuit 82 through conductors 84 to discriminator 28. In a manner well known in the art this signal is caused to vary the threshold of the pulse height discriminator. The variation is made automatically in accordance with changes in pulse height from the monitor hence the discriminator will at all times pass the same pulses regardless of the variation in their heights due to temperature or voltage changes.

A further alternative is shown in Figure 6 where the output of pulse rate conversion circuit 82 is applied through conductors 84 to voltage regulator 85, the output of which is applied through conductors 86 to power supply 45 in order to control the voltage of power supply 45 in a conventional manner. This form of the invention utilizes the monitor output to control voltage and hence amplification. When there is any change in monitor output, this change is used to vary the voltage of power supply 45 in such a way as to resist the change and maintain monitor output constant; in maintaining monitor output constant, the invention makes the detector output constant for a given radiation, independent of temperature and voltage changes. The output of voltage regulator 85 may likewise be used to regulate power supply 48.

As described above in connection with the form of the invention as shown in Figure 2, this invention is adapted for use both in detecting natural radioactivity and in detecting secondary radiation while irradiating the formations from a source of penetrating radiation.

The well log produced by the invention as illustrated in Figures 4, 5, and 6 is not independent of dark current pulses except in so far as they may be discriminated against. To make a log independent of dark currents and the effect of voltage and temperature variations on pulse height with a scintillation counter, the form of the invention as shown in Figure 2 may be combined with the form as shown in Figures 4, 5, or 6.

It is to be understood that this invention is not to be limited to the specific modifications described. In particular, the monitor unit need not be identical to the detector but need only give an output with similar characteristics so that output varies in more or less the same fashion as detector output and can be used to correct for voltage and temperature fluctuations. This invention is to be limited only by the following claims.

We claim:

1. A method of compensating for the effects produced by variations in the operating characteristics of elements used in a well surveying subsurface unit which are sensitive to variations in temperature and applied voltage, said unit having a system of elements which employs a radiation detector of the scintillation counter type, that comprises the steps of subjecting the scintillation counter to radiation emanating from the wall of the well, simultaneously and with at least one independent photomultiplier monitoring at least one of the parameters which produces only an effect that is to be compensated, utilizing the output signals from the monitor to vary the operating characteristics of at least one element in the scintillation counter system, whereby the output signals from the scintillation counter system will be representative of the intensity of the radiation emanating from the wall of the well.

2. A method of compensating for the effects produced by variations in temperature in a well surveying subsurface unit which employs as a radiation detector a scintillation counter that comprises the steps of simultaneously, with the scintillation counter, subjecting an independent photomultiplier to the same temperature environment; amplifying and treating the signal pulses from the independent photomultiplier tube in the same general manner that the signals from the scintillation counter are amplified and treated; and utilizing the amplified and treated signals from the independent photomultiplier to vary the operating characteristics of at least one element of the amplifying and treating system of the scintillation counter system; whereby their operating characteristics are varied to compensate for variations in their operating characteristics occasioned by variation in the temperature environment in which they are disposed.

3. A method of compensating for the effects produced by variations in temperature in a well surveying subsurface unit which employs as a radiation detector a scintillation counter that comprises the steps of simultaneously, with the scintillation counter, subjecting an independent photomultiplier to the same temperature environment; amplifying and treating the signal pulses from the independent photomultiplier tube in the same general manner that the signals from the scintillation counter are amplified and treated; and utilizing the amplified and treated signals from the independent photomultiplier to vary the operating characteristics of the amplifier of the amplifying and treating system of the scintillation counter system, whereby its operating characteristics are varied to compensate for variations in its operating characteristics occasioned by variation in the temperature environment in which it is disposed.

4. A method of compensating for the effects produced by variations in temperature in a well surveying subsurfaces unit which employs as a radiation detector a scintillation counter that comprises the steps of simultaneously, with the scintillation counter, subjecting an independent photomultiplier to the same temperature environment; amplifying and treating the signal pulses from the independent photomultiplier tube in the same general manner that the signals from the scintillation counter are amplified and treated; and utilizing the amplified and treated signals from the independent photomultiplier to vary the operating characteristics of the discriminator of the amplifying and treating system of the scintillation counter system, whereby its operating characteristics are varied to compensate for variations in its operating characteristics occasioned by variation in the temperature environment in which it is disposed.

5. A method of compensating for the effects produced by variations in temperature in a well surveying subsurface unit equipped with power supply means and which employs as a radiation detector a scintillation counter that comprises the steps of simultaneously, with the scintillation counter, subjecting an independent photomultiplier to the same temperature environment; amplifying and treating the signal pulses from the independent photomultiplier tube in the same general manner that the signals from the scintillation counter are amplified and treated; and utilizing the amplified and treated signals from the independent photomultiplier to vary the operating characteristics of the power supply, whereby the operating potentials from the power supply are varied to compensate for variations occasioned by variation in the temperature environment in which it is disposed.

6. A method of compensating for the effects produced by variations in temperature in a well surveying subsurface unit which employs as a radiation detector a scintillation counter that comprises the steps of simultaneously, with the scintillation counter, subjecting an independent photomultiplier to the same temperature environment; amplifying and treating the signal pulses from the independent photomultiplier tube in the same general manner that the signals from the scintillation counter are amplified and treated; and subtracting the amplified and treated signals originating with the independent photomultiplier from the amplified and treated signals originating with the scintillation counter, whereby the signal component occasioned by variation in the temperature environment in which the scintillation counter system is disposed is eliminated.

7. A method of compensating for the effects produced by variations in temperature in a neutron well surveying subsurface unit which employs as a radiation detector a scintillation counter that comprises the steps of bombarding the formations penetrated by the well with neutrons; simultaneously subjecting a scintillation counter and an independent photomultiplier to the same temperature environment while exposing the scintillation counter to radiation influenced by the neutron bombarding step; amplifying and treating the signal pulses from the independent photomultiplier tube in the same general manner that the signals from the scintillation counter are amplified and treated; and utilizing the amplified and treated signals from the independent photomultiplier to vary the operating characteristics of at least one element of the amplifying and treating system of the scintillation counter system, whereby their operating characteristics are varied to compensate for variations in their operating characteristics occasioned by variation in the temperature environment in which they are disposed.

8. A method of compensating for the effects produced by variations in operating characteristics of elements used in a well surveying subsurface unit which employs as one of said elements a radiation detector of the scintillation counter type that comprises the steps of subjecting the scintillation counter to radiation emanating from the wall of the well, simultaneously subjecting an independent photomultiplier which has been shielded from electromagnetic radiation, to the same operating environment, amplifying and treating the signal pulses from the scintillation counter, simultaneously amplifying and treating the signal pulses from the independent photomultiplier tube in the same general manner as from the scintillation counter, and utilizing the amplified and treated signals from the independent photomultiplier to vary the operating characteristics of at least one element forming a part of the subsurface unit.

9. A method of compensating for the effects produced by the variation in the voltage applied to elements in a well surveying subsurface unit which employs as a radiation detector a scintillation counter, that comprises the steps of simultaneously, with the subjection of the scintillation counter to the radiation to be measured, subjecting a second scintillation counter which has been shielded from radiation emanating from the wall of the well to radiation of a substantially constant intensity that is emitted by a source of radiation disposed adjacent thereto, utilizing the variation in the signals originating with the second scintillation counter to modify the operation of at least one element in the subsurface unit to compensate for variations in the voltage applied to at least one element of the detecting system.

10. A method of compensating for the effects produced by the variation in the voltages applied to a photomultiplier which forms a part of a radiation detector of the scintillation counter type adapted for used in a well surveying subsurface unit, that comprises the steps of simultaneously, with the subjection of the scintillation counter to the radiation to be measured, subjecting a second scintillation counter which has been shielded from radiation emanating from the wall of the well to radiation of a substantially constant intensity that is emitted by a source of radiation disposed adjacent thereto, and utilizing the variation in the signals originating with the second scintillation counter to modify the voltages applied to the photomultiplier of the first scintillation counter to compensate for variation thereof.

11. A method for compensating for the variation in amplification imparted to electrical pulses of equal energy which are being passed through an amplifier in a well surveying subsurface unit that comprises the steps of simultaneously with the subjection of a scintillation counter, which is an element of the subsurface unit, to radiation to be measured, subjecting a second scintillation counter, which has been shielded from radiation emanating from the wall of the well and which also forms an element of the subsurface unit, to radiation of a substantially constant intensity that is emitted by a source of radiation disposed adjacent thereto, and utilizing the variation in the signals originating with the second scintillation counter to modify the operating characteristics of the amplifier to compensate for variations in the amount of amplification imparted to the electrical pulses of substantially equal energy.

12. A method of compensating for the variations in the height of pulses due to variation in operating characteristics of a radiation detecting system that is adapted for use in a radioactivity well surveying subsurface unit of the type which employs a scintillation counter type of detector, amplifier, and discriminator, that comprises the steps of simultaeosuly, with the subjection of the scintillation counter to the radiation to be measured, subjecting a second scintillation counter which has been shielded from radiation emanating from the wall of the well to radiation of a substantially constant intensity that is emitted by a source of radiation disposed adjacent thereto, and utilizing the variation in the signals originating with the second scintillation counter to modify the threshold of the discriminator to pass the pulses that would have been passed had there been no variation in the voltage applied to at least one element of the detecting system.

13. A subsurface instrument for radioactivity well logging having a sealed housing adapted to withstand the pressures encountered within a deep narrow well, a radiation detecting system of the type which employs a scintillation counter disposed within said housing, said system also including amplifying and pulse conditioning elements as well as electrical means operatively connecting said elements together and to a transmission cable, the improvement which comprises means also disposed within said housing, in a manner such that it will be subjected to the same enclosed environment, that is responsive to at least one parameter that produces an undesired effect in the scintillation counter system, means for utilizing the response of said last named means for varying the operating characteristics of at least one element in the radiation detecting system whereby compensation is made for the undesired effect produced in the radiation detecting system.

14. A subsurface instrument for radioactivity well logging having a sealed housing adapted to withstand the pressures encountered within a deep narrow well, a radiation detecting system of the type which employs a scintillation counter disposed within said housing, said system also including amplifying and pulse conditioning elements as well as electrical means operatively connecting said elements together and to a transmission cable, the improvement which comprises means also disposed within said housing, in a manner such that it will be subjected to the same enclosed environment, that is responsive to changes in temperature, means for utilizing the response of said last named means for varying the operating characteristics of at least one element in the radiation detecting system whereby compensation is made for variations in operating characteristics of the radiation detecting system that are due to changes in temperature.

15. A subsurface instrument for radioactivity well logging having a sealed housing adapted to withstand the pressures encountered within a deep narrow well, a radiation detecting system of the type which employs a scintillation counter disposed within said housing, said system also including amplifying and pulse conditioning elements as well as electrical means operatively connecting said elements together and to a transmission cable, the improvement which comprises means also disposed within said housing in such a manner that it will be subjected to the same enclosed environment that is responsive to changes in temperature, means for subtracting the response of said last named means from the response of the scintillation counter system when subjected to radiation, whereby compensation is made for undesired effects produced in the radiation detecting system that are occasioned by variations in the temperature of said system.

16. A subsurface instrument for radioactivity well logging comprising a sealed housing adapted to withstand the pressures encountered within a deep narrow well, a radiation detecting system of the type which employs a scintillation counter disposed within said housing, said system also including amplifying means, pulse conditioning means, a power supply, and electrical means operatively connecting the elements together and to a transmission cable, means also disposed within said housing, in a manner such that it will be subjected to the same enclosed environment, that is responsive to changes in voltage derived from said power supply, and means for utilizing the response of said last named means for varying the operating characteristics of at least one element in the radiation detecting system, whereby compensation is made for variations in operating characteristics of the radiation detecting system that are due to changes in the voltage applied thereto.

17. A subsurface instrument for radioactivity well logging having a sealed housing adapted to withstand the pressures encountered within a deep narrow well, a radiation detecting system of the type which employs a scintillation counter disposed within said housing, said system including amplifying and pulse conditioning elements, a power supply and electrical means operatively connecting said elements together and to a transmission cable, the improvement which comprises means responsive to variations in power supplied by the power supply also disposed within said housing in a manner such that it will be subjected to the same enclosed environment, means for shielding said last recited means from external radiation, and means for utilizing the response of said means which are responsive to variations in the power supplied by the power supply for varying the operating characteristics of at least one element in the radiation detecting system whereby compensation is made for variations in operating characteristics of the radiation detecting system that are due to changes in power supplied thereto.

18. A subsurface instrument for radioactivity well logging comprising a sealed housing adapted to withstand the pressures encountered within a deep narrow well, a radiation detecting system of the type which employs a scintillation counter disposed within said housing, said system also including amplifying means, pulse conditioning means, a power supply, electrical means operatively connecting the elements together and to a transmission cable, means also disposed within said housing, in a manner such that it will be subjected to the same enclosed environment, that is responsive to changes in voltage derived from said power supply, and means for utilizing the response of said last named means for varying the operating characteristics of the amplifier in the radiation detecting system, whereby compensation is made for variations in operating characteristics of the detecting system that are due to changes in the voltage applied thereto.

19. A subsurface instrument for radioactivity well logging comprising a sealed housing adapted to withstand the pressures encountered within a deep narrow well, a radiation detecting system of the type which employs a scintillation counter disposed within said housing, said system also including amplifying means, pulse conditioning means, a power supply, electrical means operatively connecting the elements together and to a transmission cable, means also disposed within said housing, in a manner such that it will be subjected to the same enclosed environment, that is responsive to changes in voltage derived from said power supply, and means for utilizing the response of said last named means for varying the operating characteristics of the discriminator in the radiation detecting system, whereby compensation is made for variations in operating characteristics of the detecting system that are due to changes in the voltage applied thereto.

20. A subsurface instrument for radioactivity well logging having a sealed housing adapted to withstand the pressures encountered within a deep narrow well, a radiation detecting system of the type which employs a scintillation counter disposed within said housing, said system also including amplifying and pulse conditioning elements as well as electrical means operatively connecting said elements together and to a transmission cable, the improvement which comprises means also disposed within said housing, in a manner such that it will be subjected to the same enclosed environment, that is responsive to at least one parameter that produces an undesired effect in the scintillation counter system, means for utilizing the response of said last named means for varying the output of the radiation detecting system whereby compensation is made for the undesired effect produced in the radiation detecting system.

21. A subsurface instrument for radioactivity well logging saving a sealed housing adapted to withstand the pressures encountered within a deep narrow well, a radiation detecting system of the type which employs a scintillation counter disposed within said housing, said system also including amplifying and pulse conditioning elements as well as electrical means operatively connecting said elements together and to a transmission cable, the improvement which comprises means also disposed within said housing in such a manner that it will be subjected to the same enclosed environment that is responsive to changes in temperature and applied voltage, means for subtracting the response of said last named means from the response of the scintillation counter system when subjected to radiation, whereby compensation is made for undesired effects produced in the radiation detecting system that are occasioned by variations in the temperature and applied voltage.

22. A subsurface instrument for radioactivity well logging having a sealed housing adapted to withstand the pressures encountered within a deep narrow well, a radiation detecting system of the type which employs a scintillation counter disposed within said housing, said system also including amplifying and pulse conditioning elements as well as electrical means operatively connecting said elements together and to a transmission cable, the improvement which comprises means for eliminating from the output signal of said radiation detecting system that component representing dark currents, said means including means also disposed within said housing in such a manner that it will be subjected to the same enclosed environment that produces only dark currents, means for subtracting the last recited dark currents from the output signal of the radiation detecting system, whereby the dark current component of the output signal from the radiation detecting system is eliminated.

23. A subsurface instrument for radioactivity well logging having a sealed housing adapted to withstand the pressures encountered within a deep narrow well, a radiation detecting system of the type which employs a scintillation counter disposed within said housing, said system also including amplifying and pulse conditioning elements as well as electrical means operatively connecting said elements together and to a transmission cable, the improvement which comprises means also disposed within said housing, in a manner such that it will be subjected to the same enclosed environment, that is responsive to changes in temperature and voltage, means for utilizing the response of said last named means for varying the operating characteristics of at least one element in the radiation detecting system whereby compensation is made for variations in operating characteristics of the radiation detecting system that are due to changes in temperature and voltage.

ARTHUR H. YOUMANS.
RALPH MONAGHAN.

References Cited in the file of this patent
UNITED STATES PATENTS

| Number | Name | Date |
|---|---|---|
| 2,351,028 | Fearon | June 13, 1944 |
| 2,534,932 | Sun | Dec. 19, 1950 |
| 2,543,676 | Thayer et al. | Feb. 27, 1951 |